J. ZIEMBA.
EGG BEATER.
APPLICATION FILED JULY 21, 1921.
1,410,522.
Patented Mar. 21, 1922.
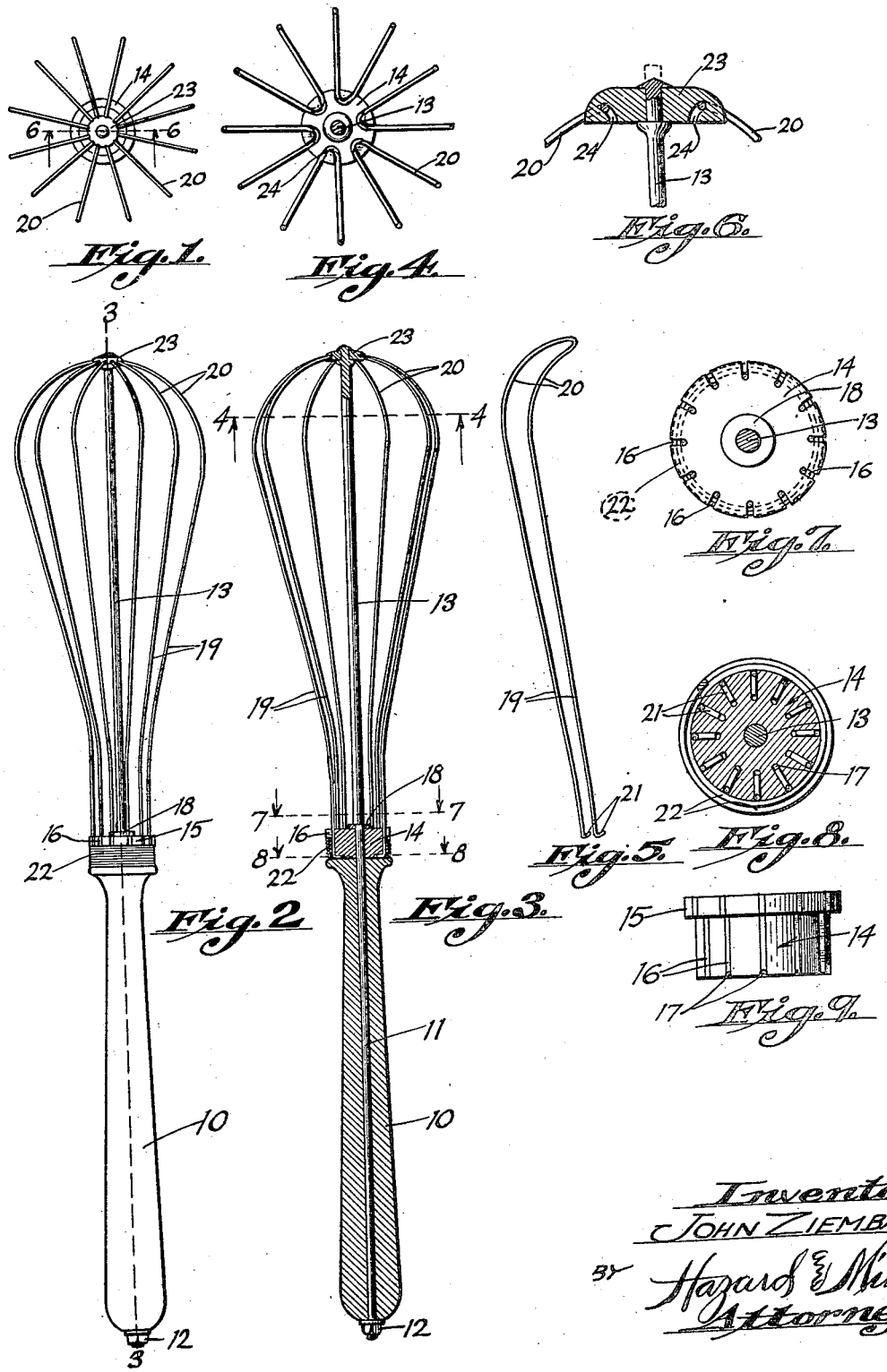

UNITED STATES PATENT OFFICE.

JOHN ZIEMBA, OF LOS ANGELES, CALIFORNIA, ASSIGNOR OF FORTY PER CENT TO FRANK H. BROWN, OF LOS ANGELES, CALIFORNIA.

EGG BEATER.

1,410,522.     Specification of Letters Patent.     Patented Mar. 21, 1922.

Application filed July 21, 1921. Serial No. 486,323.

*To all whom it may concern:*

Be it known that I, JOHN ZIEMBA, a citizen of Poland, residing at Los Angeles, in the county of Los Angeles and State of California, have invented new and useful Improvements in Egg Beaters, of which the following is a specification.

My invention relates to egg beaters of the type wherein a handle is provided at one end with a series of elongated beating members formed of resilient material, such as wire; and the principal objects of my invention are to generally improve upon and simplify the construction of the existing types of similar egg beaters and to provide a strong substantial structure that is capable of being easily and cheaply produced, and which will be very effective in performing its intended functions.

With the foregoing and other objects in view, my invention consists in certain novel features of construction and arrangement of parts that will be hereinafter more fully described and claimed and illustrated in the accompanying drawings, in which:

Figure 1 is a top plan view of an egg beater of my improved construction.

Fig. 2 is a side elevational view of the device.

Fig. 3 is a vertical section taken approximately on the line 3—3 of Fig. 2.

Fig. 4 is an enlarged cross section taken approximately on the line 4—4 of Fig. 3.

Fig. 5 is a perspective view of one of the arms or beating members of my improved device.

Fig. 6 is an enlarged detail section taken on the line 6—6 of Fig. 1.

Figs. 7 and 8 are enlarged cross sections taken on the lines 7—7 and 8—8 respectively of Fig. 3.

Fig. 9 is a side elevational view of a cylindrical block or head which serves as a bearing and point of attachment for the ends of the beating arms of the device.

Referring by numerals to the accompanying drawings which illustrate a practical embodiment of my invention, 10 designates a handle of wood or metal, and passing axially therethrough is one end portion of a rod 11, and the end of said rod that projects beyond the rear end of said handle is threaded in order to receive a nut 12.

The portion 13 of rod 11 that extends beyond the forward end of handle 10 serves as a support for the beating arms of the device, and positioned on the portion 13 of said rod immediately adjacent to the forward end of handle 10 is a short cylindrical block 14, preferably of metal, provided at its outer end with a flange 15, and formed through said flange and through the peripheral portion of the block is a series of longitudinally disposed slots 16, the lower ends of which communicate with radially disposed notches or recesses 17 that are formed in the under face of said block. This block is retained in position on the portion 13 of the rod 11 immediately adjacent to the forward end of handle 10 by a washer 18, and which latter is secured to the portion 13 of the rod in any suitable manner.

The beating members of my improved device are preferably formed of wire having a certain amount of resiliency, and a section of wire of proper length is bent at its center to form a pair of substantially parallel legs 19, and the portions of said legs immediately adjacent to the center of the section of wire, or the point where the latter is bent, are curved as designated by 20, and the opposite ends of the leg portions are bent laterally in the same direction so as to form relatively short fingers 21.

When the beater members are applied to the handle or body of the device, the lower or rear end portions of the legs 19 are positioned in the adjacent members of a pair of slots 16 in block 14 with fingers 21 occupying the corresponding notches 17, and after the entire series of beater members have been thus arranged on the block 14 they are securely fastened thereto by a wrapping 22, preferably of wire, that incloses the main body portion of the block 14 below flange 15 and overlies the end portions of the legs 19 that are positioned in the slots 16. Obviously, the end of the wrapping wire are secured to each other or to the block 14 in any suitable manner.

Secured in any suitable manner to the outer end of portion 13 of the center rod is a disc 23, and formed in the under side of the edge thereof is a series of substantially U-shaped slots or recesses 24 that receive the ends of the curved end portions 20 of the legs 19. When the parts are properly assembled the upper or outer curved portions 20 of the legs 19 are spread apart so that the same diverge away from disc 23, and such arrangement also causes the straight portions of the legs 19 to gradually diverge away from the block 14.

Thus it will be seen that I have produced an egg beater that is of strong and substantial structure, capable of being easily and cheaply produced, and which may be conveniently handled in performing beating and stirring operations.

The outer ends of the legs of the beater members are round thus enabling the device to be advantageously employed in the rounded lower ends of bowls, cups, and the like, and the resiliency of the material of which the legs are formed minimizes the force of the shock resulting from the impact between said legs and the walls of the receptacle in which it is being manipulated.

It will be understood that minor changes in size, form and construction of the various parts of my improved egg beater may be made and substituted for those herein shown and described without departing from the spirit of my invention, the scope of which is set forth in the appended claim.

I claim as my invention:

An egg beater comprising a handle, a rod extending through the handle, a cylindrical block mounted upon the rod against the end of the handle and having an outwardly extending flange, there being longitudinally extending radial slots in the periphery of the block and flange and notches in the lower end of the block, a washer secured to the rod against the block beating members formed of wire bent upon itself and having the ends bent at right angles, said bent ends fitting in the slots and notches of the block, a wrapping for securing the wires to the block, a disc secured to the outer end of the rod and having U-shaped slots in its under side, the central portions of the beaters fitting in said U-shaped slots, and a nut upon the other end of the rod against the handle to draw the disc toward the handle and hold the outer ends of the beating members in place.

In testimony whereof I have signed my name to this specification.

JOHN ZIEMBA.